Figure 2:
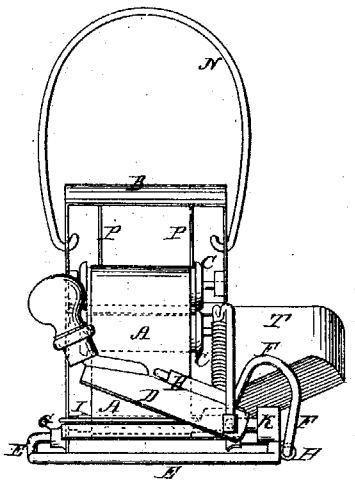
Figure 3:
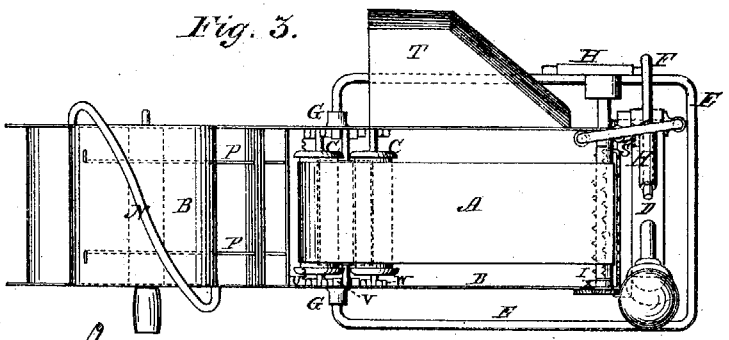
Figure 1:
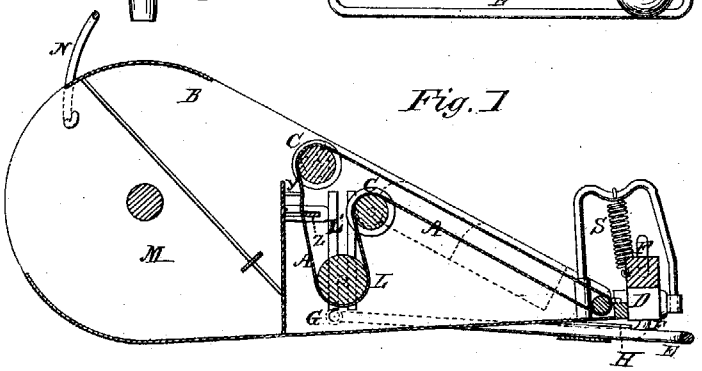

R. DICK.

ADDRESSING-MACHINE.

No. 6,832. Reissued Jan. 4, 1876.

Witnesses:

Wm. C. W. Intire.

Jno. J. Bonner.

Inventor

Robert Dick.

THE NORRIS PETERS CO., PHOTO-LITHO., WASHINGTON, D. C.

UNITED STATES PATENT OFFICE.

ROBERT DICK, OF BUFFALO, NEW YORK.

IMPROVEMENT IN ADDRESSING-MACHINES.

Specification forming part of Letters Patent No. 64,502, dated May 7, 1867; reissue No. 6,832, dated January 4, 1876; application filed November 11, 1875.

*To all whom it may concern:*

Be it known that I, ROBERT DICK, of the city of Buffalo, in the county of Erie and State of New York, have invented a new and useful Improvement on my Mailing-Machine, patented by me October 4, 1859, which improvement is fully set forth in the following specification, reference being had to the accompanying drawings.

The object of my invention is to remedy the following defects of my machine as originally patented: First, paste sufficiently substantial could not be used in it—it had no distributers; second, the belt could not be made to run continuously on the rollers—it persisted in running from side to side most vexatiously; third, the right hand had too much to do—it had to stamp the label on the paper, and then remove the paper.

Y Z are the two distributers; A, the belt passing up between them. The distributers are strips of spring-brass. Z, on the inside of the belt, is smooth on the edge, and hence leaves no paste on its side of the belt; Y, on the outside of the belt, is notched just deep enough to allow the belt to carry up with it the exact quantity of paste to impart to the label-web, while it carries it from roller C to roller I, and protrudes each label under cutter-stamp D, by it to be cut off and stamped on the paper just below it, without forcing surplus paste out upon the sides and ends, to besmear the stamp and make the labels stick to it instead of to the papers; also to make the papers fast to each other in the bundles. To prevent these evils is the function of the notched distributer Y, which, at each end, is made fast to the shell M. Distributer Z is necessarily movable; its ends spring into lips made fast to shell M. U V W X are the new bearings of the rollers C C I L. The bearings are made fast to shell M. L′ is not strictly a bearing, but a slideway and bearing combined, the function of which is to keep the lead-roller exactly parallel to all the others, while allowing it to rise and fall, so as to give at all times the requisite tension to the belt, and, in combination with the bearings proper, keep the rollers so related to the belt as to make it deliver the labels to the cutter-stamp accurately.

A is the belt, which is made of steam-packing, or other substantial material which will retain its shape and be unaffected by the moisture in the paste. The novel arrangement of the slideway-bearings serves to hold the weighted roller in place upon the belt, and permits the former to be increased in weight and diameter, as no flanges are required to keep it in place.

In the construction of my improved machine the front roller is also so enlarged that it will readily move a very substantial belt, such as would not be operated at all by a roller of the necessarily small dimension used in machines constructed according to my original patent.

E E E is the wire frame, hinged loosely to the shell M at G, and joined to the cutter-stamp D by the bent connecting-rod F F, the straight ends of which revolve and slide in tubes H H, so that when the front of the machine is raised up from the pile of papers, to remove the one last labeled, the spiral spring S lifts the blade D, and allows the front of the wire frame E to drop down about an inch, to be shoved up again the instant the machine is pressed or dropped down on the next paper. This necessarily closes the shear, as is obvious, with a snap, which cuts off and stamps on the next label, while the right hand has been removing the last paper labeled.

I claim as my invention—

1. The combination, with the shell M, of the distributers Y Z, substantially as and for the purposes set forth.

2. The combination, with the shell M, of the roller-bearings U V W X, substantially as and for the purposes set forth.

3. The combination, with the distributers Y Z and with the rollers C C I L, of the belt A, substantially as and for the purposes set forth.

4. The combination, with the shell M and of the cutter-stamp D, of the frame E E E and connecting-rod F, substantially as and for the purposes set forth.

ROBERT DICK.

Witnesses:

WM. C. MCINTIRE,
JNO. J. BONNER.